United States Patent

[11] 3,525,289

[72] Inventor Ettore C. Cercone
 Flushing, New York
[21] Appl. No. 800,231
[22] Filed Feb. 18, 1969
[45] Patented Aug. 25, 1970
[73] Assignee United Aircraft Corporation
 East Hartford, Connecticut
 a corporation of Delaware

[54] PNEUMATIC ACTUATOR
 3 Claims, 1 Drawing Fig.
[52] U.S. Cl. .................................................... 92/49,
 92/98, 92/99, 92/100
[51] Int. Cl. ........................................................ F16j 3/00,
 F01b 19/00
[50] Field of Search ........................................... 92/98,
 98RD, 99, 100, 48, 49; 91/369, 369A, 369B;
 73/407; 74/105

[56] References Cited
UNITED STATES PATENTS
| | | | |
|---|---|---|---|
| 2,507,254 | 5/1950 | Jones | 74/531X |
| 2,840,094 | 6/1958 | Taplin | 92/48 |
| 3,103,855 | 9/1963 | Hager et al. | 92/98X |
| 3,116,918 | 1/1964 | Francis | 92/49X |
| 3,152,518 | 10/1964 | Ayers Jr. | 92/49X |
| 3,410,779 | 11/1968 | Whitehead et al. | 92/98X |

FOREIGN PATENTS
| | | | |
|---|---|---|---|
| 1,213,363 | 1/1959 | France | 92/49 |

Primary Examiner— Martin P. Schwadron
Assistant Examiner— Leslie J. Payne
Attorney— Edmund C. Meisinger ABSTRACT: An actuator is disclosed wherein a half-area piston assembly traverses a fixed shaft. The piston assembly consists of two pistons having overlying rolling diaphragms fixed at the peripheries to the housing. The pistons are coupled by a sleeve which slides over the fixed shaft. The actuator converts axial motion to rotary motion in a compact assembly and provides a shorter actuator for given stroke.

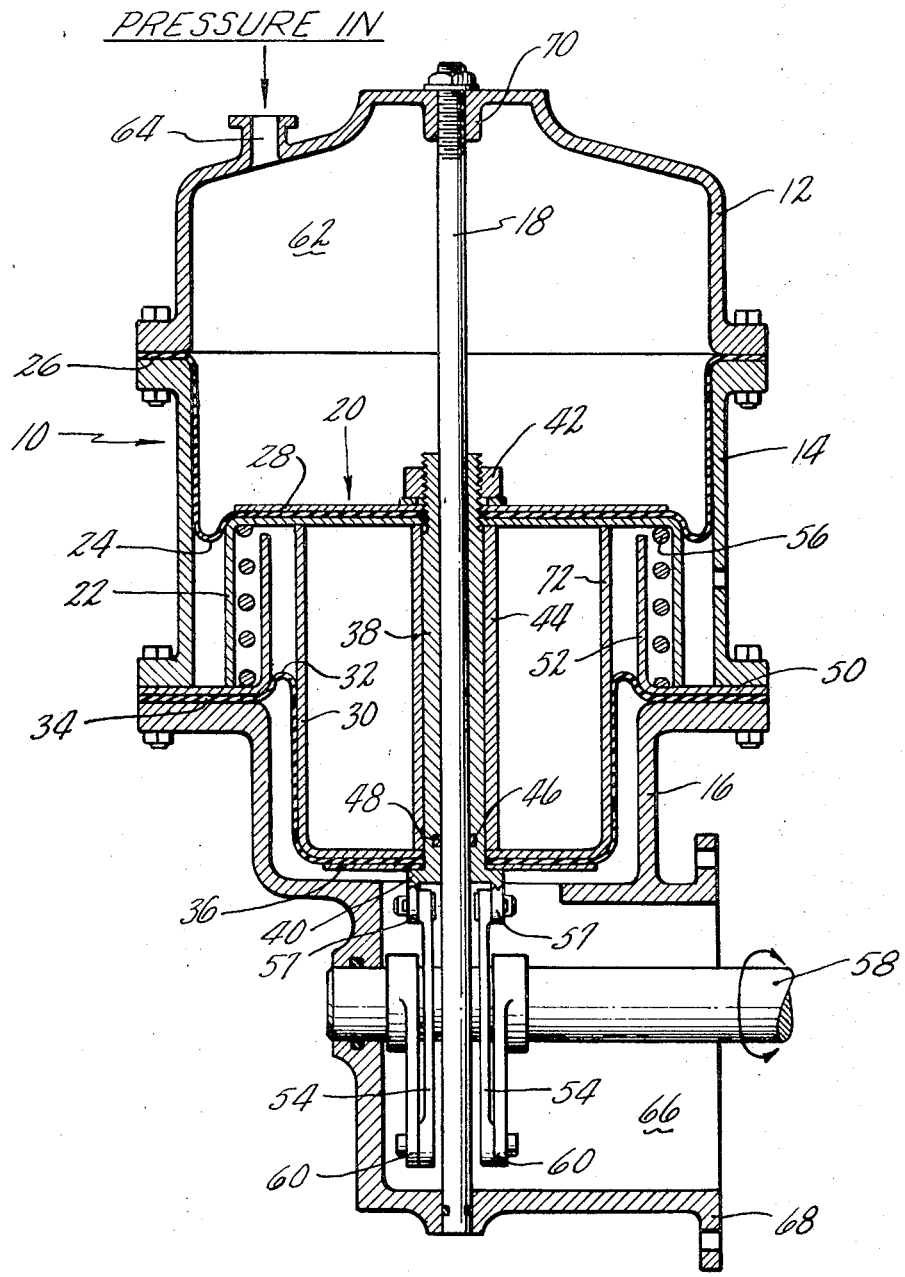

3,525,289

PNEUMATIC ACTUATOR

BACKGROUND OF THE INVENTION

This invention relates to pneumatic actuators and more specifically pertains to an improved pneumatic actuator assembly designed to convert linear motion into rotary motion.

It is known to provide actuators for operating valves which are operated by rotation of the valve about a central shaft. Typically, actuators for this purpose feature a piston and a shaft assembly which reciprocate as a unit. The actuator has to include clearance for the moving shaft and, as a result, a longer and heavier actuator is required. Previously proposed actuators having a piston sliding on a central bar for translating linear motion into rotation have been proposed but have not been fully satisfactory. Since there was no positive seal in the prior art actuators, a certain amount of leakage was experienced at the periphery of the piston. Furthermore, the prior art actuators required a pressure differential across the piston in order to provide the rotary motion because the effective area ratio across the piston could not be simply varied. In many applications, significant benefits are realized by actuating a valve against a high back pressure where the servo-controlled actuating pressure is lower than the back pressure.

SUMMARY OF THE INVENTION

It is an object of this invention to provide an improved actuator for converting linear motion into rotary motion.

Another object of this invention is the provision of a pneumatic actuator consisting of a piston assembly with different effective areas guided by a fixed shaft. Another aspect of this invention lies in the nesting of the rolling diaphragms to provide a compact piston assembly.

In accordance with the invention, a piston assembly is disposed upon a sleeve which translates on a fixed longitudinal shaft. The piston assembly consists of a large inverted cup piston and an elongated smaller cup piston disposed in part within the large piston and both pistons have a rolling diaphragm overlying the outer base walls. The sleeve locates the piston assembly concentric with the fixed shaft and couples the two pistons into a unitary assembly. A cylinder guide, interposed between the pistons, provides a rolling surface for the diaphragm associated with the smaller cup piston. A link connects the piston assembly to a crank on a transversely located rotatable shaft for converting linear motion to rotary motion. It has been observed that the unique nesting of diaphragms, the area ratios afforded by the design of the piston assembly, and the heights of the cupped pistons are uniquely combined to provide an actuator having a long stroke in a relatively short housing.

Other objects and advantages of the present invention will become more apparent from the following detailed description of a preferred embodiment thereof and from the accompanying drawing.

BRIEF DESCRIPTION OF THE DRAWING

The single figure is a schematic sectional view of a pneumatic actuator embodying the features of this invention.

DESCRIPTION OF THE PREFERRED EMBODIMENT

As may be seen in the figure, a pneumatic actuator embodying the features of the present invention is shown as having a housing indicated generally as 10. The housing is separated into an upper section 12, a central section 14, and a lower section 16 for purposes of illustration and ease of assembly. Rod 18 is centrally located and extends from the upper section 12 of the housing longitudinally through the housing to the lower section 16 of the housing and functions as a guide on which the piston assembly indicated generally as 20 slides.

The piston assembly 20 includes an inverted cup piston 22 having a rolling diaphragm 24 overlying its upper wall and its peripheral edge 26 clamped between abutting flanges of the housing. The diaphragm 24 is securely retained against the large piston upper wall by the retention plate 28. A smaller elongated cup piston 30 is disposed in part within the large piston and has a rolling diaphragm 32 overlying its lower surface and the rolling diaphragm 32 is retained by abutting flanges of the housing at its peripheral edge 34. The lower diaphragm is securely retained against the piston 30 by retention plate 36. A central sleeve 38 is provided having a shoulder 40 disposed at one end for engaging the retention plate 36 and a nut 42 threaded on the sleeve so that the piston assembly may be securely locked into a unit. It is evident that the sleeve 38 centrally locates the piston assembly over the rod 18 for the purpose of facilitating longitudinal movement of the piston assembly on the rod.

Tube 44 may be provided to rigidify the piston assembly. The rod 18 is chrome plated and graphite is embedded in the inner surface of sleeve 38 to minimize sliding friction. A tight fit would cause binding between the sleeve and the rod. Seal 46 is provided between the sleeve 38 and the rod 18 to prevent leakage. The seal is retained within circumferential groove 48 in the sleeve 38. A diaphragm guide 52 essentially cylindrical in shape is interposed between the large and the small pistons and projects toward the large diameter piston 22. The diaphragm guide 52 has an outwardly flaring base 50 disposed between abutting flanges of the housing and is retained therein in conjunction with the rolling diaphragm 32 associated with the elongated cup piston 30. Spring 56 is disposed between the diaphragm guide 52 and the inverted cup piston 22 and bottoms against the housing.

Shoulder 40 on the sleeve 38 has projecting lugs 58 which engage links 54 thereby connecting the sleeve to the rotatable shaft 58 through crank arms 60. The rotatable shaft 58 is connected to an actuator valve. Links 54 may be replaced by a yoke which straddles the rod 18 and a single crank arm may be used.

In operation, controlled servo-pressure is supplied to the chamber 62 through the boss 64; and chamber 66 contains supply pressure to which the actuator is exposed when mounted at flange 68. As servo-pressure is increased, the piston assembly slides down the rod into the position shown in the figure. It is evident that various piston effective areas may be selected within the scope of this invention. Since the piston assembly has different effective areas, the pressure in chamber 62 required to displace the piston depends upon the piston area ratio selected and can be considerably lower than the pressure in chamber 66. The controlled servo-pressure in chamber 62 must also compress spring 56.

In order that the invention will be more easily understood, sequential operation of the piston will be described. Assuming that the servo-control pressure decreases below that required to maintain the piston assembly in the lower position, the pressure force over the piston area of the smaller piston and the force provided by the compressed spring 56 will translate the piston assembly along the shaft 18 to the uppermost position which occurs when the piston assembly reaches stop 70. The diaphragm 24 is guided by the walls of the inverted large piston. The wall length of the large piston should exceed one-half the piston travel so that there is sufficient wall length to provide a support structure for the rolling diaphragm 24 when the piston assembly is in the uppermost position. Similarly, as the piston assembly moves upward, the lower rolling diaphragm is guided along the inner surface of the cylinder diaphragm guide 52. It is apparent that the diaphragm 32 is not guided by the elongated section 72 of the small diameter cup. The elongated section 72 of the small diameter cup is provided for the purpose of rigidifying the piston assembly. Further, if the small diameter piston were not elongated, the stroke of the piston assembly would be greatly reduced. The elongated piston height is preferably equal to or greater than the stroke of the piston assembly. Similarly, the preferred height of the inverted large cup piston and the cylindrical guide is approximately equal to or slightly greater than one-half the stroke of the piston assembly. As the piston assembly traverses the rod, it is readily apparent that the links 60 are caused to move thereby causing the pivot bars 60 to rotate the shaft 58. The actuator provides at least 90° of rotation and is capable of opening or closing the valve.

Although the invention has been shown and described with respect to a preferred embodiment, it should be understood by those skilled in the art that various changes and omissions in the form and detail may be made therein without departing from the spirit and scope of this invention.

I claim:
1. A pneumatic actuator comprising:
a housing;
means for providing air under pressure to each end of the housing;
a rod extending longitudinally of the housing and fixed to the housing at each end;
a large inverted cup piston having a rolling diaphragm overlying its upper wall and its peripheral edge fixed to the housing;
a small elongated cup piston disposed in part within the large piston having a rolling diaphragm overlying its bottom wall and its peripheral edge fixed to the housing;
a sleeve concentric with and slidably engaged over the fixed rod, the sleeve having a shoulder disposed at the small cup piston end and having means for coupling the two pistons into a unitary piston assembly at the other end;
a seal disposed between the sleeve and the longitudinal rod;
a cylinder diaphragm guide interposed between the large and the small piston projecting toward the large piston;
a shaft rotatably disposed transversely through the housing; and
a link, engaging a crank on the rotatable shaft and engaging the shoulder of the sleeve whereby axial translation of the piston assembly converts to rotary motion of the rotatable shaft.

2. An actuator as in claim 1, wherein the height of the elongated cup piston is substantially equivalent to the stroke of the piston assembly.

3. An actuator as in claim 2, wherein the height of the large cup piston and the height of the cylinder diaphragm guide are substantially equivalent to one-half the stroke of the piston assembly.